(12) United States Patent
Reghunath et al.

(10) Patent No.: US 10,325,174 B2
(45) Date of Patent: Jun. 18, 2019

(54) SYSTEM AND METHOD FOR AN EFFICIENT HARDWARE IMPLEMENTATION OF CENSUS TRANSFORM

(71) Applicant: TEXAS INSTRUMENTS INCORPORATED, Dallas, TX (US)

(72) Inventors: Anish Reghunath, Plano, TX (US); Hetul Sanghvi, Richardson, TX (US); Michael Lachmayr, Boxford, MA (US); Mihir Mody, Karnataka (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/707,695

(22) Filed: Sep. 18, 2017

(65) Prior Publication Data

US 2019/0087681 A1   Mar. 21, 2019

(51) Int. Cl.
    *G06K 9/46*     (2006.01)
    *G06K 9/62*     (2006.01)
    *G06K 9/48*     (2006.01)

(52) U.S. Cl.
CPC ......... *G06K 9/4642* (2013.01); *G06K 9/4661* (2013.01); *G06K 9/6202* (2013.01); *G06K 9/481* (2013.01)

(58) Field of Classification Search
CPC .. G06K 9/4642; G06K 9/4661; G06K 9/6202; G06K 9/481; G06K 9/6211; H04N 2013/0081; H04N 13/0081; H04N 13/128; H04N 13/239; H04N 13/271; G01C 11/06
See application file for complete search history.

(56) References Cited

U.S. PATENT DOCUMENTS

| | | | | |
|---|---|---|---|---|
| 9,501,703 B2 * | 11/2016 | Oh | ...................... | G06K 9/00818 |
| 2015/0003736 A1 * | 1/2015 | Choi | ..................... | G06K 9/6217 |
| | | | | 382/190 |
| 2015/0071360 A1 * | 3/2015 | Nguyen | ............... | H04N 19/597 |
| | | | | 375/240.18 |
| 2018/0027224 A1 * | 1/2018 | Javidnia | ............... | H04N 13/239 |
| | | | | 382/154 |

* cited by examiner

*Primary Examiner* — Ali Bayat
(74) *Attorney, Agent, or Firm* — Michelle F. Murray; Charles A. Brill; Frank D. Cimino

(57) ABSTRACT

Systems and methods for performing Census Transforms that includes an input from an image, with a support window created within the image, and a kernel within the support window. The Census Transform calculations and comparisons are performed within the kernel windows. One disclosed method allows for previously performed comparison to be calculated and compared as an if not equal invert or if equal use pervious comparison hardware design. Alternatively, a new Census Transform is disclosed which always inverts a previously made comparison. This new approach can be demonstrated to be equivalent to, applying the original Census Transform, on a pre-processed input kernel, where the pre-processing step adds a fractional position index to each pixel within the N×N kernel. The fractional positional index ensures that no two pixels are equal to one another, and thereby makes the Original Census algorithm on pre-processed kernel same as the new Census algorithm on original kernel. The hardware design for this new Census Transform kernel allows for an always invert of previous comparison system resulting in reduced hardware and power consumption.

17 Claims, 11 Drawing Sheets

FIG. 1

| | | | | | | | | | | | | | | | | |
|---|---|---|---|---|---|---|---|---|---|---|---|---|---|---|---|---|
| | p(0,0) | p(1,0) | p(2,0) | p(3,0) | p(4,0) | p(5,0) | p(6,0) | p(7,0) | p(8,0) | p(9,0) | p(10,0) | p(11,0) | p(12,0) | p(13,0) | p(14,0) | p(15,0) |
| | p(0,1) | p(1,1) | p(2,1) | p(3,1) | p(4,1) | p(5,1) | p(6,1) | p(7,1) | p(8,1) | p(9,1) | p(10,1) | p(11,1) | p(12,1) | p(13,1) | p(14,1) | p(15,1) |
| | p(0,2) | p(1,2) | p(2,2) | p(3,2) | p(4,2) | p(5,2) | p(6,2) | p(7,2) | p(8,2) | p(9,2) | p(10,2) | p(11,2) | p(12,2) | p(13,2) | p(14,2) | p(15,2) |
| | p(0,3) | p(1,3) | p(2,3) | p(3,3) | p(4,3) | p(5,3) | p(6,3) | p(7,3) | p(8,3) | p(9,3) | p(10,3) | p(11,3) | p(12,3) | p(13,3) | p(14,3) | p(15,3) |
| | p(0,4) | p(1,4) | p(2,4) | p(3,4) | p(4,4) | p(5,4) | p(6,4) | p(7,4) | p(8,4) | p(9,4) | p(10,4) | p(11,4) | p(12,4) | p(13,4) | p(14,4) | p(15,4) |
| | p(0,5) | p(1,5) | p(2,5) | p(3,5) | p(4,5) | p(5,5) | p(6,5) | p(7,5) | p(8,5) | p(9,5) | p(10,5) | p(11,5) | p(12,5) | p(13,5) | p(14,5) | p(15,5) |
| | p(0,6) | p(1,6) | p(2,6) | p(3,6) | p(4,6) | p(5,6) | p(6,6) | p(7,6) | p(8,6) | p(9,6) | p(10,6) | p(11,6) | p(12,6) | p(13,6) | p(14,6) | p(15,6) |
| | p(0,7) | p(1,7) | p(2,7) | p(3,7) | p(4,7) | p(5,7) | p(6,7) | p(7,7) | p(8,7) | p(9,7) | p(10,7) | p(11,7) | p(12,7) | p(13,7) | p(14,7) | p(15,7) |
| | p(0,8) | p(1,8) | p(2,8) | p(3,8) | p(4,8) | p(5,8) | p(6,8) | p(7,8) | p(8,8) | p(9,8) | p(10,8) | p(11,8) | p(12,8) | p(13,8) | p(14,8) | p(15,8) |
| | p(0,9) | p(1,9) | p(2,9) | p(3,9) | p(4,9) | p(5,9) | p(6,9) | p(7,9) | p(8,9) | p(9,9) | p(10,9) | p(11,9) | p(12,9) | p(13,9) | p(14,9) | p(15,9) |

FIG. 2A

| A(x,y) | B(x,y) | C(x,y) |
|---|---|---|
| D(x,y) | E(x,y) | F(x,y) |
| G(x,y) | H(x,y) | I(x,y) |

FIG. 2B

| $A(x,y)=(p(x,y)\geq p(x-1,y-1))$ | $B(x,y)=(p(x,y)\geq p(x,y-1))$ | $C(x,y)=(p(x,y)\geq p(x+1,y-1))$ |
|---|---|---|
| $D(x,y)=(p(x,y)\geq p(x-1,y))$ | $E(x,y)=(p(x,y)\geq p(x,y))=1\text{always}$ | $F(x,y)=(p(x,y)\geq p(x+1,y))$ |
| $G(x,y)=(p(x,y+1)\geq p(x-1,y+1))$ | $H(x,y)=(p(x,y)\geq p(x,y+1))$ | $I(x,y)=(p(x,y)\geq p(x+1,y+1))$ |

SYSTEM AND METHOD FOR AN EFFICIENT HARDWARE IMPLEMENTATION OF CENSUS TRANSFORM

CROSS-REFERENCE TO RELATED APPLICATIONS

This application relates to U.S. application Ser. No. 15/041,933, filed Feb. 11, 2016, now pending, the disclosure of which is incorporated herein by reference for all purposes.

BACKGROUND

Technical Field

The present disclosure relates to Census Transforms. More particularly, and not by way of limitation, the present disclosure is directed to a system and method for an efficient hardware implementation of Census Transform for image processing.

Description of Related Art

A Census Transform is an image transform that computes, for each pixel in an image, a feature vector that describes the relative intensity changes around that pixel in a very compact way. Census Transform is very robust against illumination changes making it useful for the kind of feature matching used in stereovision or optical flows. However, because a comparison has to be made for each individual pixel of the image there are a considerable number of redundant comparisons.

SUMMARY

The present disclosure provides systems and methods for Census Transform that is particularly advantageous in image processing algorithms, such as but not limited to, Dense Optical Flow (DOF) applications that by example can include object tracking, structure from motion imaging, and moving object segmentation. However, other image processing algorithms can also benefit advantageously from this present disclosure due to the reductions in required calculations and hardware.

A Census Transform is performed on both a reference frame (time) and a current frame (time+1), and then the Census Transform signatures of the reference and the current frames are compared against one another to establish where the grayscale intensity of an image has shifted. These reference frames are full images that are then parsed into kernels or neighborhoods that are of N×N size. As comparisons are made the kernel or neighborhood shifts along the entire image, resulting in a multitude of comparisons that require comparators for each individual comparison, including the conjugate or inverse comparisons for those pixels that have previously been compared in a first or forward comparison, and then again in a second or backward comparison. To simplify, the Census Transform utilizes a Heaviside step function that converts a comparison of the two or more adjacent pixels into a logic or logical one (1) or zero (0). In an N×N kernel or neighborhood, the comparison can result in a Census Transform signature that can be compared from image frame to image frame, to determine when and where the grayscale intensity has shifted.

One possible embodiment and solution to the problems posed by comparing each individual pixel during each comparison is to store the conjugate of the comparison or the location of the previously compared pixels allowing the software and hardware to know that the comparison has already been performed. However, the problem is where the previous comparison is of equal values as this generates an issue as to whether the change is a greater than or less than. Thus, one requirement with this embodiment is the comparison of the pixels to determine if they are equal or not. It should be noted that if a systematic processing scheme for the moving of the kernel or neighborhood is utilized then the values or location of previous comparisons would not need to be stored as the program and hardware can know which pixels have already been compared.

In another exemplary embodiment, a new Census Transform algorithm is defined in which if a comparison was determined to be previously performed, then that previous comparison result is always inverted and used as the current result. This results in dramatically reduced hardware and power consumption This new approach can be demonstrated to be equivalent to adding a fractional position index to each pixel within the N×N census kernel, thereby resulting in no two pixels being equal to one another, and then applying the original Census Transform on this pre-processed kernel. The new Census Transform, although not producing a Census Transform signature exactly matching the original Census Transform algorithm signature, shall still remain as a feature vector that describes the relative intensity changes around a pixel and shall be as useful as the original Census Transform in the applications that are listed above.

BRIEF DESCRIPTION OF THE DRAWINGS

The novel features believed characteristic of the disclosed principles are set forth in the appended claims. The disclosed principles, however, as well as a preferred mode of use, further objectives and advantages thereof, will be best understood by reference to the following detailed description of illustrative embodiments when read in conjunction with the accompanying drawings, wherein:

FIG. 1 is an illustration of a table with marked pixel positions.

FIG. 2A is an illustration of a 3×3 kernel or neighborhood utilized in a Census Transform.

FIG. 2B is an illustration of a 3×3 kernel or neighborhood utilized in a Census Transform with the Heaviside step function shown.

DETAILED DESCRIPTION

Figure 3:
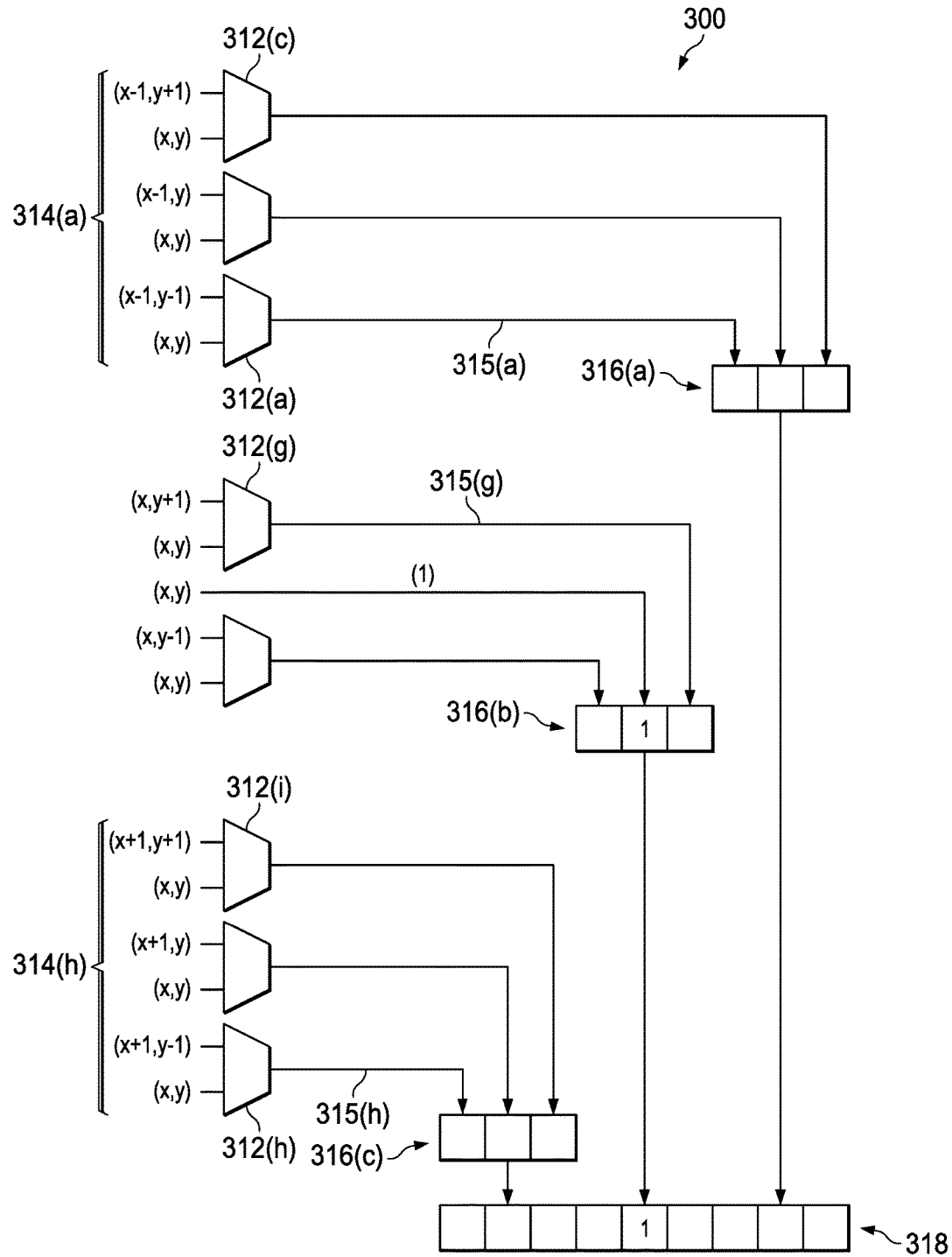
FIG. 3 is an illustration of the required comparators, along with the inputs and outputs, corresponding to an exemplary Census Transform signature.

Embodiments in accordance with the disclosed principles will now be described. Census Transforms are an increasingly popular image processing transform that are used in a variety of image processing system such as, but not limited to, automotive camera systems, stereo-vision camera systems, synthetically created images, and optical flow systems. A Census Transform is an image transform that computes a feature vector for each pixel in an image that describes the relative intensity changes around each pixel in an image. The transform offers robustness against illumination changes, which makes it a good transform for the kind of feature matching used in stereovision and optical flow. However, Census Transform is quite computational intensive and usually is typically implemented on an logic implementation circuit or module, which may comprise a field-programmable gate array (FPGA), an application-specific integrated circuit (ASIC), a System-on-a-Chip (SoC), or other logical board or processor, and which may be implemented in any hardware or software or combination thereof, and each of which is capable of performing Census Transform. However, it would be understood that Census Transform algorithms and processes could also be implemented on a standalone logic system, which also may be implemented in hardware and/or software.

FIG. 1 is an illustration 100 of an image 102 with marked pixel positions 104(n), wherein n represents the pixel position p(x,y) and will be collectively referred to as 104. Each of the pixel positions 104 is individual to the image and has characteristics that are only applicable to that image. These characteristics can include, but are not limited to: metadata, rgb pixel intensity, grayscale pixel intensity, hue intensity, saturation intensity, file format. For a Census Transform, the grayscale intensity is of most importance. A Census Transform is a comparison of the grayscale intensity value of adjacent pixels to a selected reference pixel, typically the adjacent pixels and the reference pixel within a sized window of pixels.

FIG. 2A is an illustration 200A of a kernel or neighborhood 200 utilized in a Census Transform. An image 102 is broken down for the Census Transform into N×N kernels or neighborhoods 206. Each of these N×N kernels 206 is utilized to compare the neighboring kernel pixels 208(A)-208(I) (collectively 208) to the centermost kernel pixel 208(E) of the N×N kernel 200. The comparison of each pixel 208 within the N×N kernel 206 to the centermost kernel pixel 208(E) results in a logical output for the each pixel, this logical output is then utilized to create the kernel Census Transform signature. Each of these pixels can be included in both a kernel window and/or a support window in later preformed Census Transform calculations.

In image processing applications involving Census Transform, typically an M×M "support window" is first chosen in the reference frame and current frame. For a pixel matching application, which tries to find a matching pixel in the current frame for a particular pixel (also called an anchor pixel or reference pixel) in the reference frame, the approach is as follows. A Census Transform signature for all of the pixels in the support window corresponding to the anchor pixel in the reference frame is first calculated, utilizing the N×N kernel for Census Transform.

A search set is defined comprising of different pixels in the current frame, one of which will become the eventual matching pixel for the anchor pixel in the reference frame. For each pixel in the search set, a M×M support windows is defined around it and the Census Transform signature is calculated for all pixels in that support window. Each of these support windows with their census signatures is then compared against the Census Transform signatures of the support window for the anchor pixel in the reference frame. A comparison of census signatures between pixels in two support windows can employ a Hamming Distance (number of bits which differ in the two census signatures) as the measure of the comparison. The Hamming distance of all the pixels in the support window can then be added together to create a cumulative Hamming distance for the whole of the support window. At the end of comparison the pixel in current frame search set, whose support window is having the minimum cumulative Hamming distance compared to the support window of the anchor pixel in the reference frame, is considered as the best match.

The support window above is chosen on an application by application basis in order to provide the best matching algorithm at the same time trying to reduce the cost of hardware implementation (as larger support windows will have larger cost of hardware implementation). The kernel window 206 is shifted throughout the entirety of the image 102 or support window, typically in a left to right and up to down process.

FIG. 2B is an illustration 200B of a kernel or neighborhood 206 utilized in a Census Transform with the Heaviside step function comparison shown within the pixel positions 209(A)-209(I) (collectively 209). As the kernel window 206 is moved throughout the image 102, the grayscale intensity of each pixel 209 is compared and measured against the centermost pixel 209(E). It should be noted that the centermost pixel 209(E) when compared to itself will always generate a logical output of 1. It would be understood that in illustrations 200A and 200B the kernels could be increased in size to N×N scale, and are shown as 3×3 for illustrative purposes.

The Heaviside step function is utilized to generate the logic output of the Census Transform comparison. The comparison in a Census Transform generates a zero when the comparison of the compared pixel's grayscale intensity value is less that the centermost or reference pixel grayscale intensity. Alternatively, when the compared pixel's grayscale intensity value is equal to or greater than the grayscale intensity value of the centermost or reference pixel, the Heaviside step function generates a logical output of 1. Each of these comparisons requires at least one comparator to perform.

FIG. 3 is an illustration 300 of the required comparators (collectively 312), along with the inputs (collectively 314) and outputs (collectively 315) corresponding to the Census Transform signature 318. The implementation of a Census Transform is often performed utilizing an implementation block or module, such as a Field Programmable Gate Array (FPGA) or other logical board or processor. The Census Transform could also be performed in software or hardware. The implementation block is configured to receive the pixels of an image 102 that has been previously further simplified into a kernel or neighborhood window 206, as inputs 314. The inputs 314(a)-(i) allow each kernel pixel 208 to be compared with the centermost kernel pixel 208(E). The comparison is performed by comparators 312 that have been configured on the FPGA or other logical board or processor. However it would be understood that the comparators 312 could also be a standalone logic system or performed solely in hardware or software. The outputs 315 of each comparator may optionally be placed in smaller registers or flip-flop logic blocks (collectively 316), which could also be called or considered as partial Census Transform signatures. These smaller registers or flip-flop logic blocks 316 allow for the creation of a full Census Transform signature 318, which can be done through the utilization of larger registers or sets of flip-flop logic blocks. For each position of the kernel window 206, a Census Transform signature is created.

The inputs 314 to each comparator is the grayscale intensity value for the compared pixel and the reference or centermost pixel of the kernel. In some embodiments, one or more of these inputs may have additional logic blocks prior to entering the comparator as an input. The comparison is typically a direct comparison of the two values, but in certain embodiments there may also be other values to consider as well, such as, but not limited to, fractional values, decimal values, baud values, upper limits, lower limits, or any combination thereof.

The outputs 315 of the comparators 312 represent the logic or digital logic output of the comparators 315 that is sent to the registers 316 and/or 318 that represent the Census Transform signature for the kernel. In some embodiments, multiple registers or flip-flops or other logic storage mechanisms or devices may be utilized to create and store the Census Transform signature.

Figure 4:
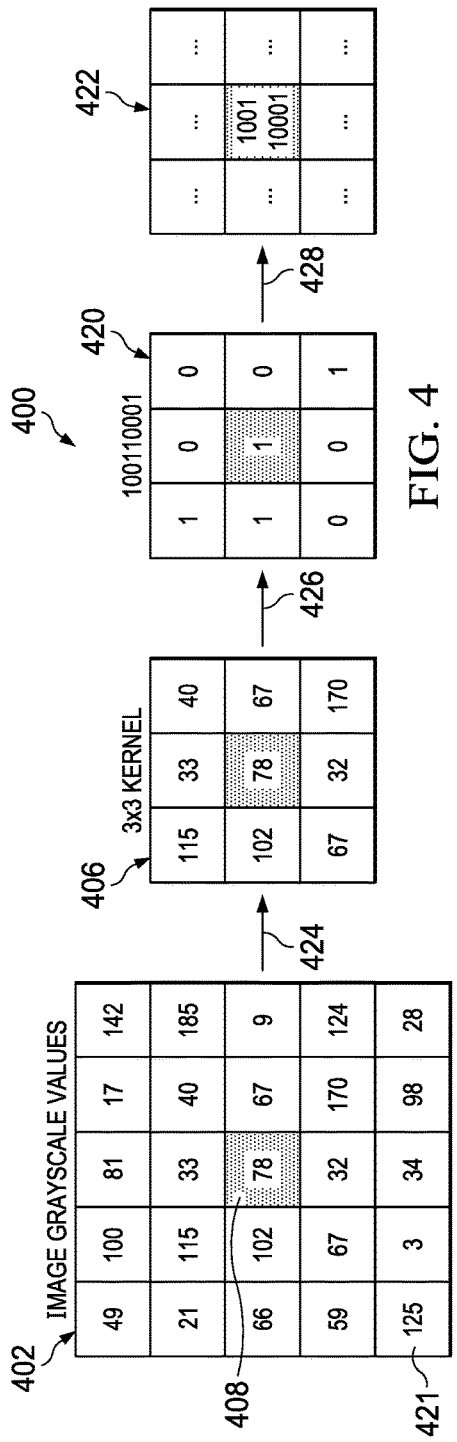
FIG. 4 is an illustration of an image with grayscale intensity values shown, then reduced to a Census Transform signature of a 3×3 kernel.

FIG. 4 is an illustration 400 of an image 402 with grayscale intensity values 421 shown, then reduced to an N×N or as shown in illustration 400 as a 3×3 kernel 406, then has a Census Transform 420 performed, and finally shows the Census Transform signature of the kernel 422. In alternative embodiments, an M×M support window may be utilized to focus the Census Transform on a specific portion of the image 402.

The image 402 is overlaid or parsed into N×N kernel windows 406, this transition 424 is the start of the Census Transform process. The N×N kernel window 406 has individual pixels adjacent to the centermost kernel pixel 408 that can be compared during the Census Transformation and will result in a logical output of one or zero in Census Transformation transition 426. These logical outputs can then be used to create the Census Transform signature for each kernel window 406 during transition 428.

In most applications, once the Census Transform is calculated, it is used to find a correspondence match between a "current" frame and a "reference" frame. In these operations, typically a "support window" (e.g.: 7×7) around the pixel is used for the match rather than just the pixel itself. A kernel window 406 is utilized in an image 402 or a support window as described in order to determine the Census Transform signature of the kernel that can then be utilized in a comparison of the current frame support window and reference frame support window. For example, one of the comparisons that may be performed is a search of the image Census Transform signatures for an exact copy in another portion of the image or a comparison of the current and reference frames for the same Census Transform signature. This comparison can be calculated via the Hamming distance. In an exemplary embodiment of the present disclosure the Hamming distance of all the pixels in the support window can then be added together to create a cumulative Hamming distance for the whole of the support window. At the end of comparison the pixel in Current frame search set, whose support window is having the minimum cumulative Hamming distance compared to the support window of the anchor pixel in the reference frame, is considered as the best match.

Figure 5:
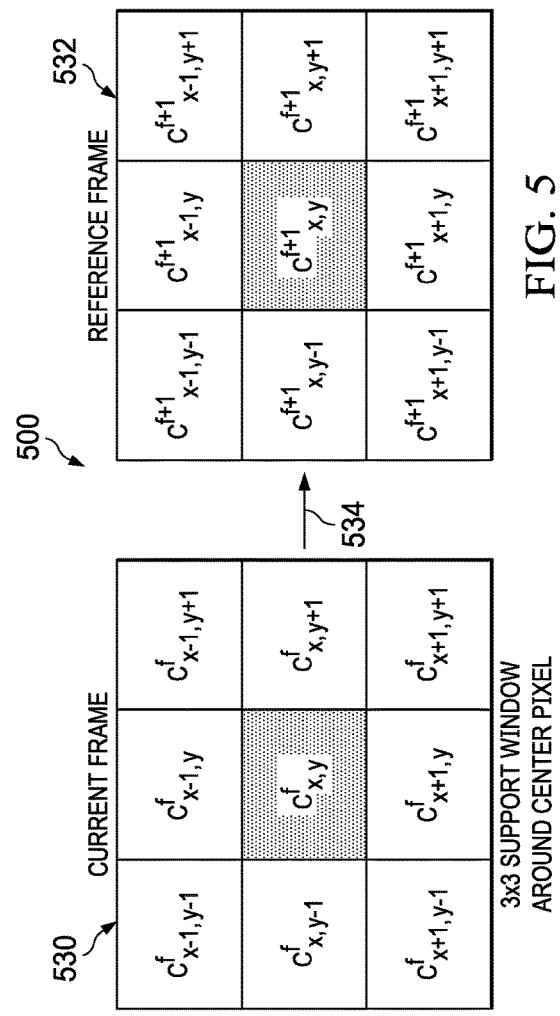
FIG. 5 is an illustration of a current frame and reference frame utilized by pre- and post-Census Transform systems.

FIG. 5 is an illustration 500 of a current frame 530 and reference frame 532 utilized by pre- and post-Census Transform systems. The difference between the current frame 530 and the reference frame 532 is often a time step 534. Additionally, there can be differences in the images themselves that the Census Transform is being used to detect. Pre- and post-Census Transform systems may utilize not only the output of the Census Transform but also the images themselves pre- and post-Census Transform to make specific calculations.

As discussed previously, in some embodiments the current and reference frames will be compared with one another, or the Census Transform signatures within the current and reference frames, respectively. Systems can utilize the Census Transform signatures to search for the same grayscale intensity and likely the same image features in both the current and reference frames. This would allow systems to determine how far a particular portion or feature has shifted in an image. Accordingly, Census Transform is very useful in self-driving vehicles or in vehicle sensor systems, as well as in other image processing algorithms and systems. Thus, if a system can reduce the time and/or space and/or power required to perform Census Transform, it would allow for an increased or faster processing, and often reduced chip real estate and/or power consumption, for driverless or self-driving vehicles and allows for safer vehicles to be developed that can process and adjust accordingly for object avoidance. Additionally, other image processing algorithms and systems could be advantageously improved by the new Census Transform.

Figure 6A:
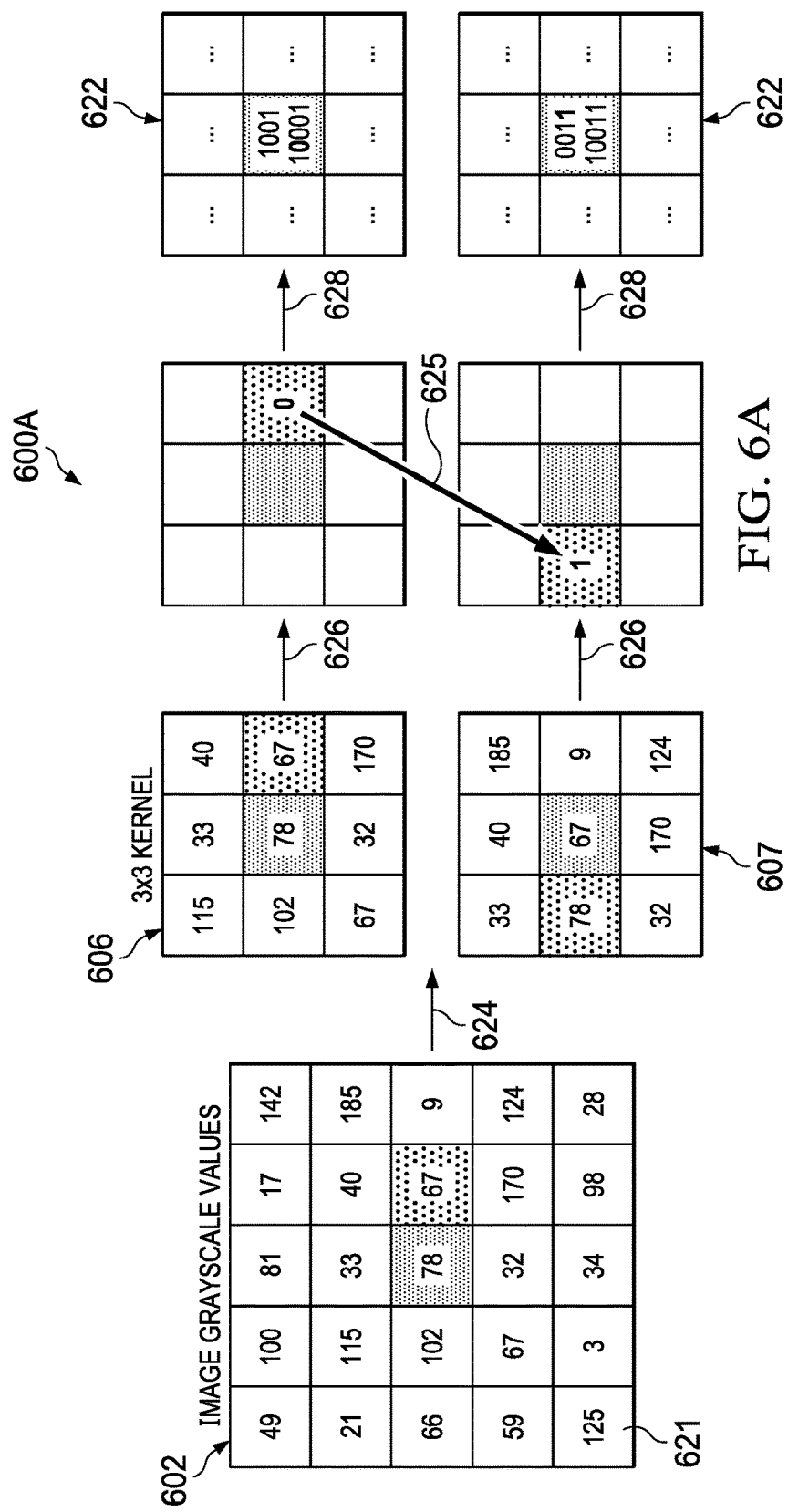
FIG. 6A is an illustration of an image with grayscale intensity values shown, then reduced to a Census Transform signature of two 3×3 kernels in two different adjacent positions with the inversion of the conjugate comparison.

FIG. 6A is an illustration 600A of an image 602 with grayscale intensity values 621 shown, then reduced 624 to a 3×3 kernel 606 or 607 in two different adjacent positions 606 v. 607, then has a Census Transform performed 626 of both adjacent positions with the inversion of the conjugate comparison 625, and finally shows the Census Transform signature of both kernels 622. Illustration 600A shows a Census Transform performed on two adjacent N×N kernels 606 and 607, as well as how by using inversion of the conjugate of the previously compared pixels the number of required comparators can be reduced. By reducing the number of comparators there is both a reduction in the required power and the required space or digital logic area (or digital logic gate) on image processing chips.

The inversion of the conjugate is performed when the comparison of the reference pixel to the compared pixel has already been previously evaluated. If the comparison has not been previously evaluated, then the comparison would be calculated using normal Census Transform techniques. Accordingly, the number of comparisons are reduced utilizing this method. One situation does arise for those compared values when they are equal: it must be determined which direction the comparison and Heaviside function should go, though it traditionally will result in the same value for both pixels rather than an inversion.

Figure 6B:
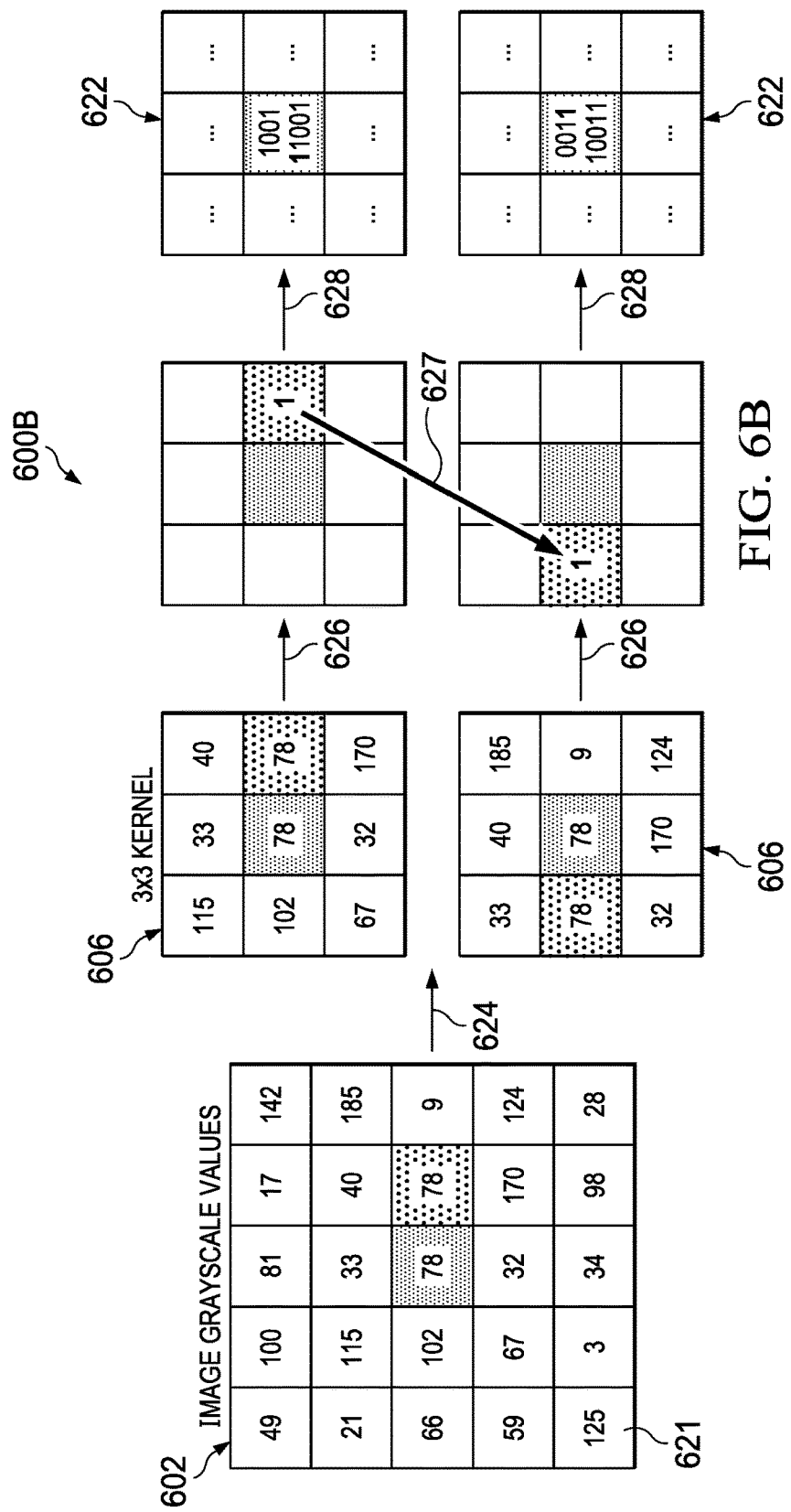
FIG. 6B is an illustration of an image with grayscale intensity values shown, then reduced to a Census Transform signature of two 3×3 kernels in two different adjacent positions with the lack of inversion of the conjugate comparison due to the compared pixels being the same intensity.

FIG. 6B is an illustration of an image 602 with grayscale intensity values 621 shown, then reduced 624 to a 3×3 kernel 606 or 607 in two different adjacent positions 606 v. 607, then has a Census Transform performed 626 of both adjacent positions with the lack of inversion of the conjugate comparison 627 on those pixels that had been previously calculated and due to the compared pixels being the same intensity, and finally shows the Census Transform signature of both kernels 622. Unlike the illustration shown in 600A, the illustration in 600B does not result in the inversion of the conjugate comparison because the grayscale intensity of the two pixels is equal to each other. Therefore, there is the need to know if the compared values are equal as this changes whether the value of the comparison during the Census Transform is an inversion or not. However, because a check does need to be performed to determine if the intensity values are equal for the compared pixels, and a comparator is used for this check, an overall reduction in hardware realized is small.

The entire support window or image can be pushed through the hardware for Census Transform in one push, in a forward or left to right and up to down comparison only. After the Census Transform has been completed, then a check can be made for pixels in an if-not-equal-then-invert, or if-equal-then-keep-the-same as the previous comparison. It is this if equal or if not equal comparison that keeps the amount of hardware required roughly the same as a traditional Census Transform system. However, it does result in much faster calculations as only one set of comparisons are required, unless the intensity values of both the reference or centermost pixel and the compared pixel within the kernel are the same. The increased speed can be valuable even if it does not reduce the amount of hardware required. It would be understood that the if not equal then invert, or if equal then keep the same as the previous comparison could be considered a post-modified Census Transform completion processing (post-modified CT processing).

Figure 6C:
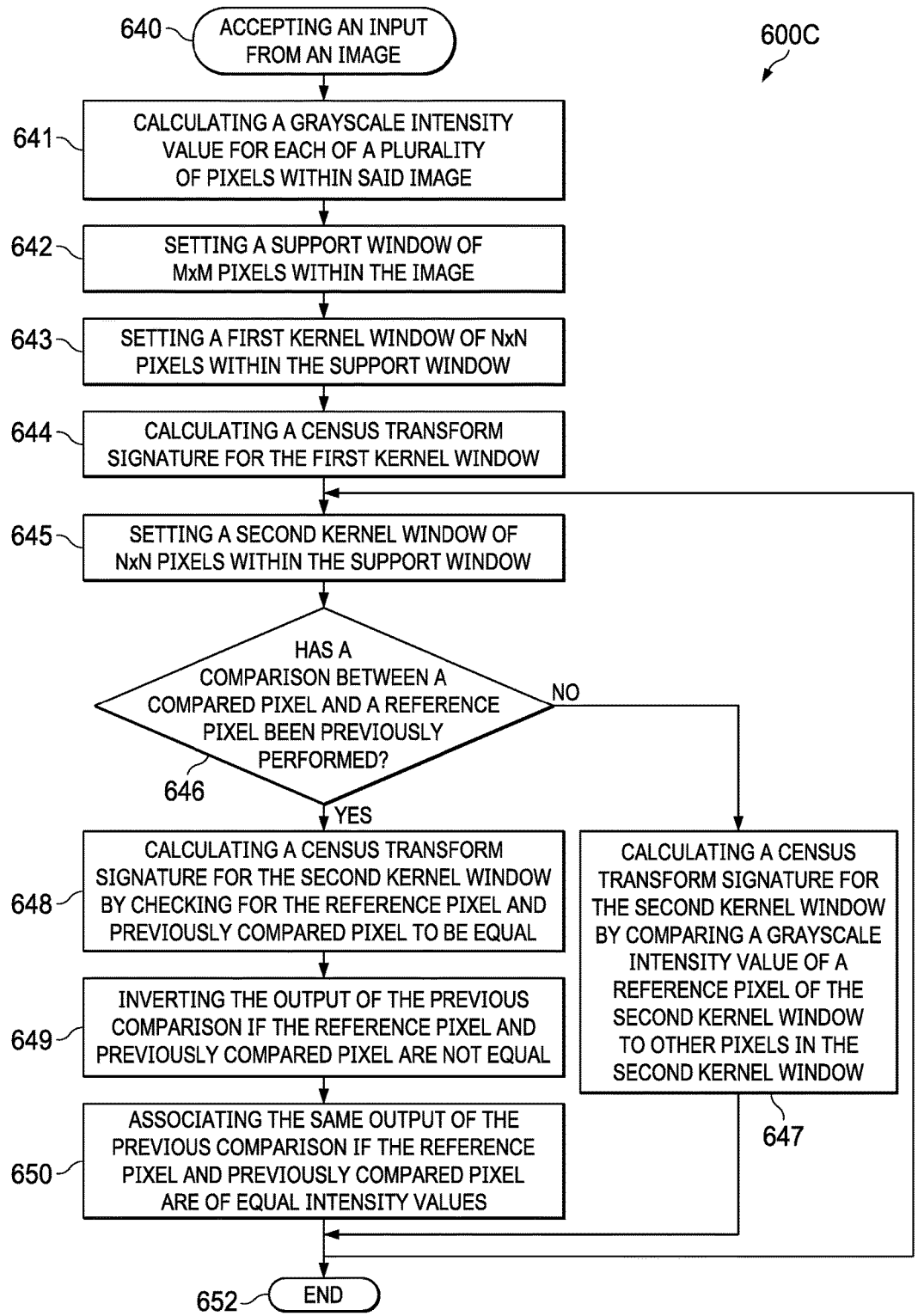
FIG. 6C is an illustration of a flow chart of an exemplary method of performing the Census Transform illustrated in FIGS. 6A and 6B.

FIG. 6C is an illustration of a flow chart of an exemplary method of performing the Census Transform process illustrated in FIGS. 6A and 6B. To begin the Census Transform process, an input from an image is received and accepted at Step 640. Thus, accepting an input from an image is the initial step in performing a Census Transform. The image can be from a single or multiple inputs or synthetically created images (such as, but not limited to, a panoramic, digitally enhanced, or stereo images or image flows), for example, but not limited to, from an automotive camera system for driverless vehicles or a single security camera at a security checkpoint. A calculation of the grayscale intensity value for each of a plurality of pixels within said image is then performed at Step 641 in order for the Census Transform process to be performed correctly.

For each time step or single image, the setting of a support window of M×M pixels within the image is performed at Step 642. The support window is primarily defined from the algorithm chosen for a specific application and also based on the hardware requirements as well. The hardware is the limiting factor on the size of the support window, i.e., the larger the support window the more hardware space or digital logic are required on the chip. Within each support window, this exemplary process in accordance with the disclosed principles also sets a first kernel window of N×N pixels at Step 643. The setting a first kernel window of N×N pixels within the support window is critical to the Census Transform as the disclosed process then calculates a Census Transform signature for the first kernel window at Step 644 by comparing a grayscale intensity value of a reference pixel to that of each other pixel in the first kernel window. After Census Transform of the first kernel is performed, the setting of a second kernel window of N×N pixels within the support window is done at a Step 645 and is created by shifting the first kernel window by at least one pixel. Within the second kernel window, as well as any subsequent kernel windows, at Step 646 it is determined if a comparison between a compared pixel and a reference pixel has been previously performed.

Thus, for systems and methods in accordance with the disclosed principles, a question arises whether the current pixel comparison is that of previously compared pixels or previously uncompared pixels. Since, in our approach, the Census Transform for all pixels in a support window is always done in a "left-right" raster followed by "top-bottom", the hardware always knows the answer of this question for every pixel with respect to every other pixel in the census kernel. Thus, the hardware will know that as it moves one pixel to the right, that it has already performed the Census Transform for a specific number of previously compared pixels. Therefore, no additional "memory or logic is needed to store this information (whether a comparison was previously done) for every pixel in the support window. I.e., because of the specific order of the support window and kernel shifting that hardware can be setup to if-not-equal-then-invert, or if-equal-then-keep, the result of the previously compared pixels where required. For previously uncompared pixels, calculating a Census Transform signature for the second kernel window is performed at Step 647 by comparing a grayscale intensity value of a reference pixel of the second kernel window to other pixels in the second kernel window not previously compared to the reference pixel of the second kernel window. For previously compared pixels in the second kernel window, however, calculations can begin by utilizing the previously calculated comparisons when the previously compared pixels have equal grayscale intensity values, or utilizing the inverse conjugate of the previously calculated comparisons when the previously compared pixels have differing grayscale intensity values. In other words, calculating a Census Transform signature for the second kernel window for previously compared pixels is initiated by checking for the reference pixel and previously compared pixel to be equal at Step 648. Then, an inverting of the output of the previous comparison if the reference pixel and previously compared pixel are not equal is provided at Step 649, or an associating the same output of the previous comparison if the reference pixel and previously compared pixel are of equal intensity values occurs at Step 650. Finally, the Census Transform process can either be terminated at Step 652 or returned back to the process of shifting the second kernel window throughout any remaining portions of the support window, which would return the illustrated exemplary process to Step 645 (for a third kernel window of the support window and so on) rather than ending the process at Step 652.

Figure 7:
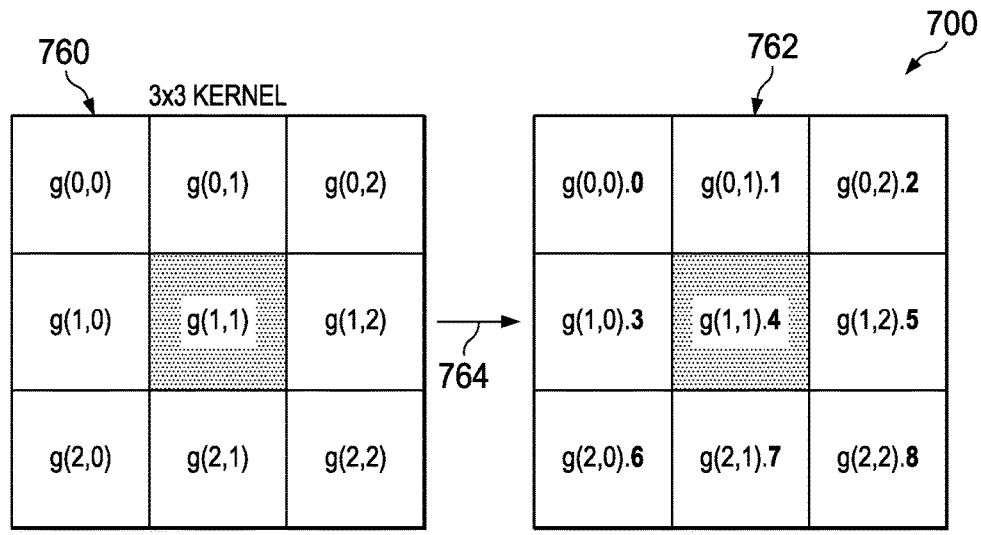
FIG. 7 is an illustration of both a non-fractional position index based kernel and a fractional position index based kernel created for a demonstration of the new or modified Census Transform in accordance with the disclosed principles.

FIG. 7 is an illustration 700 of a new Census Transform that is disclosed eliminating the "compare-if-equal-then-same-else-invert" step, and replacing it with an "always invert" step. This significantly reduces the hardware implementation cost as compared with the original Census Transform. The new Census Transform, although not producing a census signature exactly matching the original Census Transform algorithm signature, shall still remain as a feature vector that describes the relative intensity changes around a pixel and shall be as useful as the original Census Transform in the applications listed above.

The new Census Transform allows the number of comparators required during a Census Transform to be reduced dramatically because the conjugate comparison can now always be inverted after a previous comparison. As an illustration the new Census Transform can be demonstrated to be equivalent to the original Census Transform algorithm having a pre-processing step which appends a fractional positional index to every pixel in the kernel. The fractional index makes sure that no two values are the same in the kernel before the original Census Transform algorithm is applied. Thus the same result is obtained for the original Census Transform with the pre-processed fractional kernel compared to the new Census Transform with the non-pre-processed non-fractional kernel.

Figure 8:
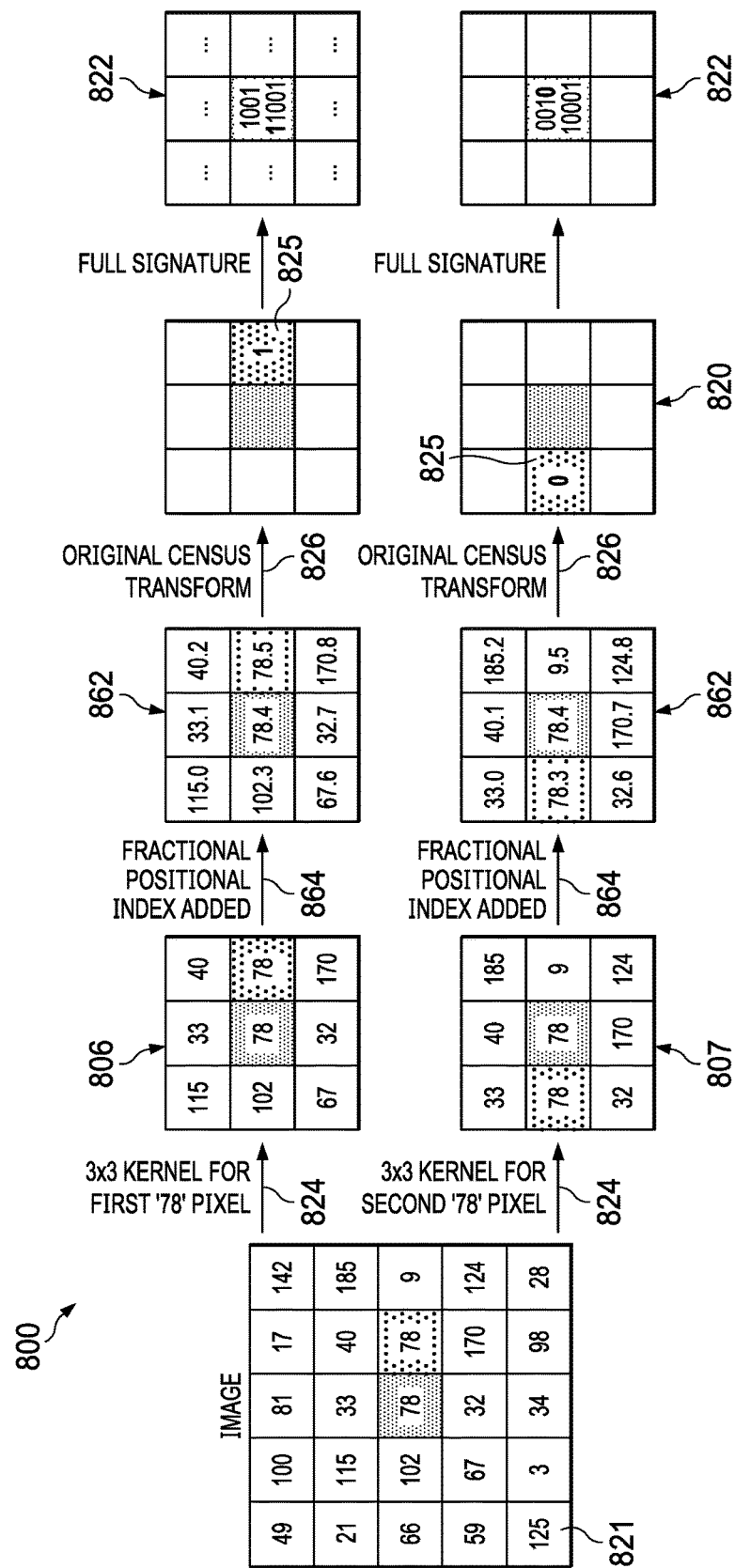
FIG. 8 is an illustration of an image with grayscale intensity values shown, then reduced to 3×3 kernels in two different adjacent positions with the inversion of the conjugate comparison where the compared pixels have the same intensity because of the preprocessing step in accordance with the disclosed principles.
Figure 9A:
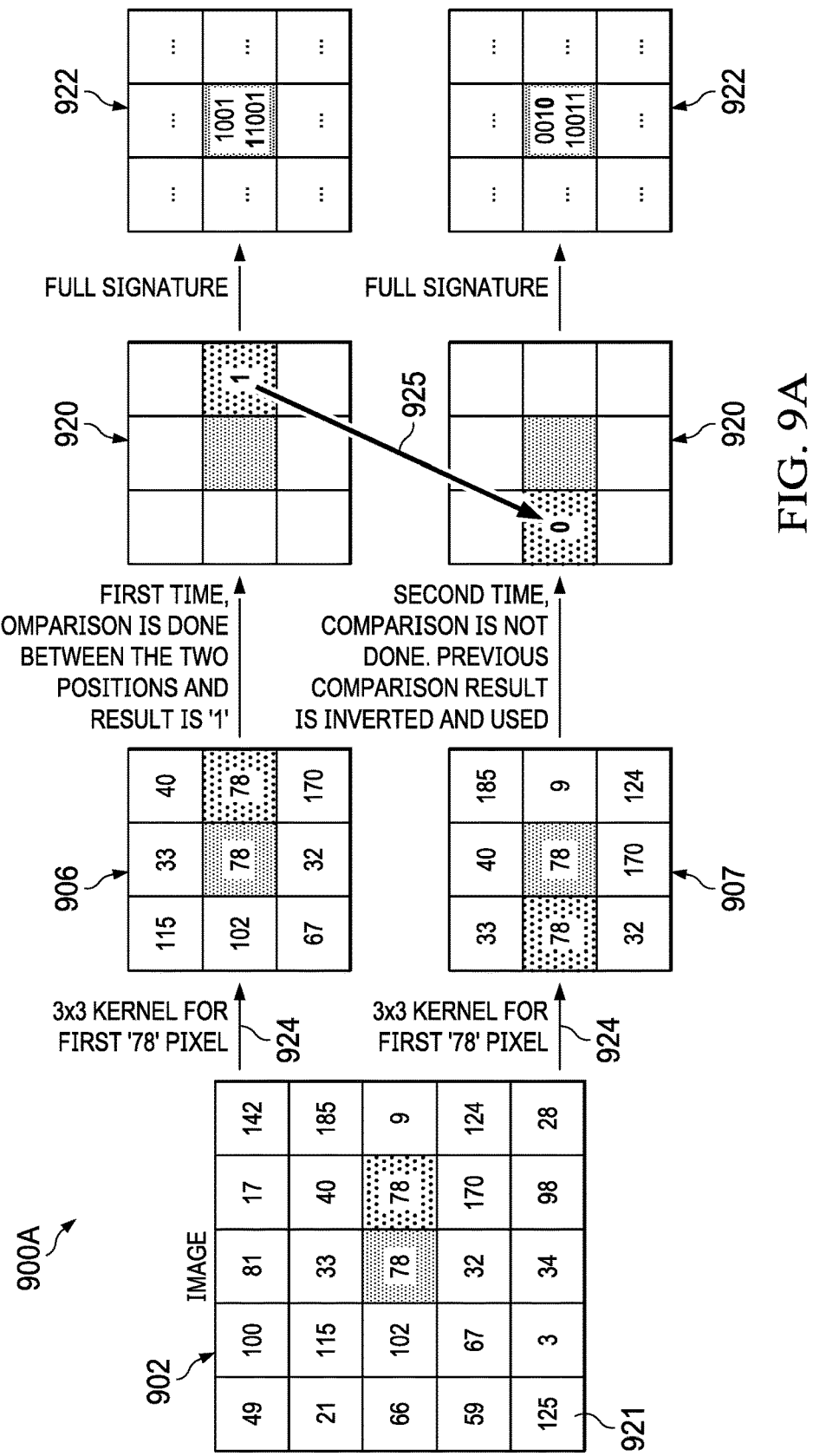
FIG. 9A is an illustration of an image with grayscale intensity values shown, then reduced to a Census Transform signature of two 3×3 kernels in two different adjacent positions with the inversion of the conjugate comparison where the compared pixels have the same intensity.

FIGS. 7, 8 and 9A are showing this equivalence of the "new Census Transform" with the "original Census Transform on pre-processed fractional kernel." A non-fractional position index based kernel 760 being converted via a "pre-transform processing" 764 (this is an illustrative example only for showing the equivalence, no physical or digital conversion to a fractional kernel actually occurs in the disclosed "new Census Transform"), in accordance with another embodiments of the disclosed principles, to a fractional position index based kernel 762. By converting the non-fractional position index based kernel 760 via the pre-transform processing 764 disclosed herein, there are never two pixels with the same intensity value, thereby reducing the original Census transform from an "if not equal then invert, or if equal then keep" scheme to an "always invert" scheme. Thus, we can show the equivalence of the "original Census Transform on pre-processed fractional kernel" with the "new Census Transform" disclosed herein.

As shown in illustration 700, the non-fractional position index kernel 760 is pre-transform processed 764 to have a decimal value that corresponds to the individual pixel position in the fractional position index based kernel. After the kernel has been processed to include the position decimal values, a Census Transform is performed utilizing the decimal values resulting in a lack of equal values allowing all of the redundant comparisons to be inversions of the previous comparison. This process in accordance with the disclosed principles is described in further detail below.

FIG. 8 is an illustration 800 of original Census Transform and pre-processing creating fractional positional kernel of an image 802 with grayscale intensity values 821 shown, then reduced 824 to a 3×3 kernel 806/807 in two different adjacent positions (806 and 807, respectively), then each of the 3×3 kernels are modified by a fractional index 864 resulting in a modified 3×3 kernel 862, then the modified kernels 862 have a Census Transform performed 826 of both adjacent positions with the signatures being the complement (inversion) of one another due to the fractional index, even though originally the pixels had the same value. More specifically, an image 802 is separated into the N×N kernels 806/807 (shown here as 3×3 kernels). These kernels 806/807 are modified in a "pre-transform processing" step 864 that adds for illustrations purposes a decimal value that corresponds to each pixel's positional index value within the kernel 806/807. Each of the kernels are then processed using an original Census Transform process in accordance with the disclosed principles that does not calculate the redundant comparisons of the image or kernel.

FIG. 9A is an illustration 900A of an image 902 with grayscale intensity values 921 shown, then reduced 924 to a 3×3 kernel 906/907 in two different adjacent positions 906 and 907, then the kernels 942 have a Census Transform performed 926 of both adjacent positions with the inversion of the conjugate comparison 925 always, regardless whether the compared pixels have the same intensity, and finally shows the Census Transform signature 922 of both kernels. More specifically, an image 902 is given to the system for performing a Census Transform. The image 902 has a kernel 906/907 set that can be of an N×N size and for brevity is shown as a 3×3 in FIG. 9A. A Census Transform is then performed 926 on the kernel 942. However, in accordance with the disclosed principles, the Census Transform is modified in such a way that it only performs forward comparisons (left to right, up to down) and no backward comparisons are calculated because they are redundant and would only be the inversion of the previously calculated comparison 925. The output of these comparisons and inversions or previous conversions are then utilized to form the Census Transform signature for each kernel 922 and it can be seen that the Census signature in FIG. 9A matches with the Census signature calculated in FIG. 8.

Figure 9B:
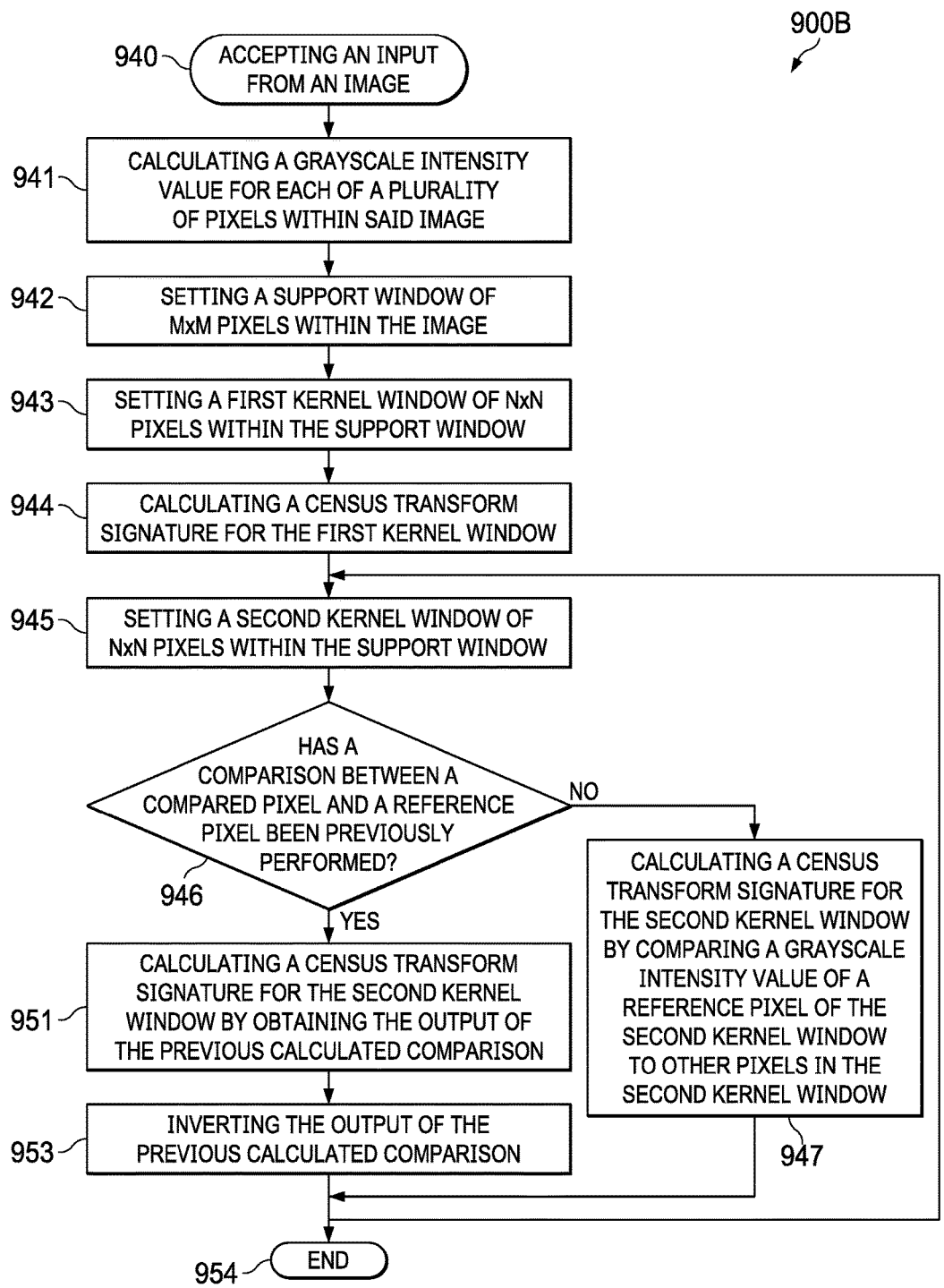
FIG. 9B is an illustration of a flow chart of an exemplary method of performing in hardware, the new Census Transform illustrated in FIG. 9A.

FIG. 9B is an illustration 900B of a flow chart of an exemplary method of performing the Census Transform illustrated in FIG. 9A. To begin the Census Transform process, an input from an image is received and accepted at Step 940. Thus, accepting an input from an image is the initial step in performing a Census Transform according to this exemplary process of the disclosed principles. The image can be from a single or multiple inputs, for example, a stereo camera system for driverless vehicles or a single security camera at a security checkpoint. A calculation of the grayscale intensity value for each of a plurality of pixels within said image is then performed at Step 941 in order for the Census Transform process to be performed correctly.

For each time step or single image, the setting of a support window of M×M pixels within the image is then provided at Step 942. An illustrative example of this, the hardware will know that as it moves one pixel to the right, that it has already performed the Census Transform for a specific number of previously compared pixels. Therefore, no additional "memory or logic is needed to store this information (whether a comparison was previously done) for every pixel in the support window. I.e., because of the specific order of the support window and kernel shifting that hardware can be setup to invert the previously compared pixels where required. Within each support window, an exemplary process according to the disclosed principles also sets a first kernel window of N×N pixels at Step 943. The setting of a first kernel window of N×N pixels within the support window is critical to the Census Transform disclosed herein as the first kernel window requires calculating a Census Transform signature for the first kernel window at Step 944 by comparing a grayscale intensity value of a reference pixel to that of each other pixel in the first kernel window. Prior to performing the calculation of the Census Transform signature for the first kernel window and/or any additional kernel windows within the support window the hardware will already know and calculations or comparisons have already been performed, as an illustration it is like the system generating of a fractional position index value for each pixel in the kernel window as a fractional index position value. Therefor the disclosed principles prevent any two grayscale intensity values within the kernel window from ever being the same and allows for all previous comparison values to be inverted.

After Census Transform of the first kernel, the setting of a second kernel window of N×N pixels within the support window is created in Step 945 by shifting the first kernel window by at least one pixel. Within the second kernel window, as well as any subsequent kernel windows, it is determined if a comparison between a compared pixel and a reference pixel has been previously performed in Step 946. Thus, at this Step 946, a question arises of whether the current pixel comparison is that of previously compared pixels or previously uncompared pixels. However, in our approach, the Census Transform for all pixels in a support window is always done in a "left-right" raster followed by "top-bottom", the Hardware always knows the answer of this question for every pixel with respect to every other pixel in the census kernel. Thus, the hardware will know that as it moves one pixel to the right, that it has already performed the Census Transform for a specific number of previously compared pixels. Therefore, no additional "memory or logic is needed to store this information (whether a comparison was previously done) for every pixel in the support window. I.e., because of the specific order of the support window and kernel shifting that hardware can be setup to invert the previously compared pixels where required. For previously uncompared pixels, calculating a Census Transform signature for the second kernel window is performed by comparing a grayscale intensity value of a reference pixel of the second kernel window to other pixels in the second kernel window not previously compared to the reference pixel of the second kernel window at Step 947.

For previously compared pixels in the second kernel window, calculations can begin by utilizing the inverse conjugate of the previously calculated comparisons. In other words, calculating a Census Transform signature for the second kernel window for previously compared pixels is initiated by obtaining the output of the previous calculated comparison at Step 951. Then, an inverting of the output of the previous calculated comparison occurs at Step 953. Finally, this embodiment of a disclosed Census Transform process can either be terminated at Step 954, or returns back to Step 945 of the process for shifting from the second kernel window to a third kernel, and so on, throughout any remaining portions of the support window.

Figure 10:
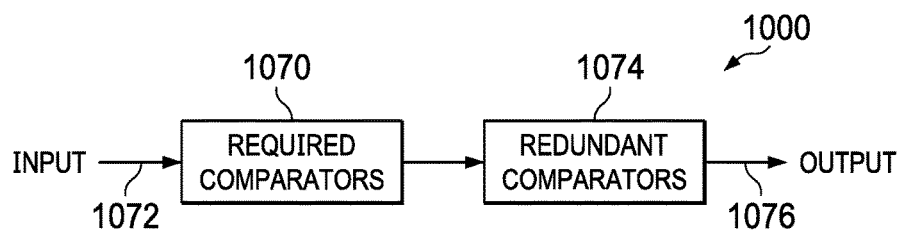
FIG. 10 is an illustration of the required and redundant comparators of previous Census Transform systems.

FIG. 10 is an illustration 1000 of the required comparators 1070 that accept the input 1072 of an image or image flow (not shown), and the redundant comparators 1074 of previous Census Transform systems that generates an output 1076. These previous Census Transform systems would perform forward and backward Census Transform calculations resulting in the duplication of many calculations that can be eliminated using the systems and methods presented herein.

Figure 11:
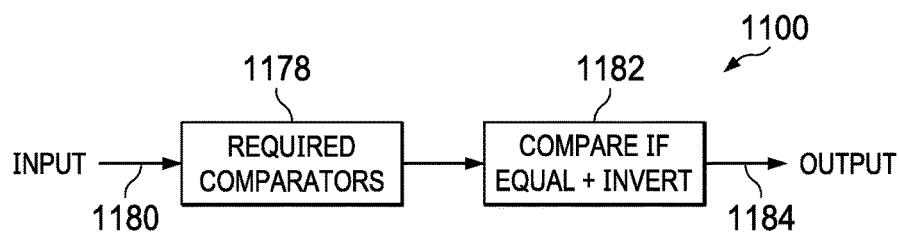
FIG. 11 is an illustration of the required comparators and the compare if equal and invert comparator system in accordance with the disclosed principles.

FIG. 11 is an illustration 1100 of the required comparators 1178 that accept the input 1180 of an image or image flow (not shown), and the compare if equal and invert comparator system 1182 that generates an output 1184. As the image comes into the system as an input 1180, it is run through the required comparators utilizing kernels and/or support windows to generate a partial group of Census Transformation logical output. The remaining outputs are calculated utilizing the compare if equal and invert comparator system 1182, which looks to see if the reference pixel within the kernel and the compared pixel have the same intensity value. The if equal and invert comparator system 1182 allows the calculation time to be shorted due to being much like a AND or XOR logic gate. If the intensity value of the reference and compared pixels are the same, the logical output to the Census Transform signature is a one, while an unequal signal will be inverted. Thus, processing time is decreased as the operation can be completed with logic blocks rather than comparators.

Figure 12A:
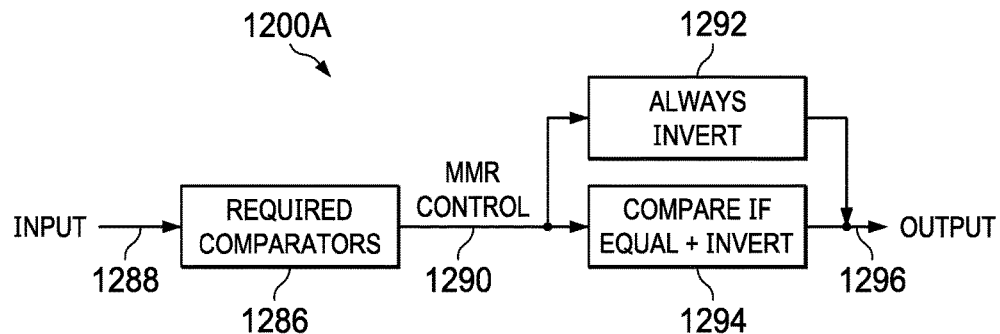
FIG. 12A is an illustration of an exemplary user modifiable system allowing the compare if equal and invert, or the always invert system, of the disclosed principles.

FIG. 12A is an illustration 1200A of a user modifiable Census Transform system in accordance with the disclosed principles that includes the required comparators 1286, which accept the input 1288 image (not shown). A user (not shown) may modify 1280 the system through a logic control (Memory Mapped programmable Register (MMR) control) allowing Census Transform to be performed utilizing the compare if equal and invert system 1294, or the always invert system 1292, both of which generate an output 1296.

Figure 12B:
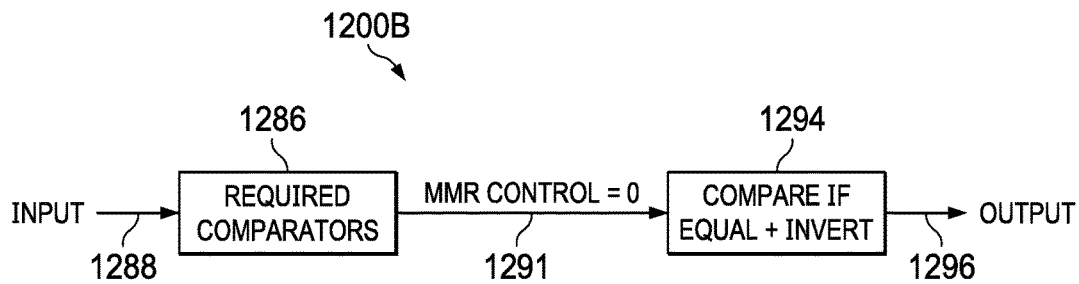
FIG. 12B is an illustration of the user modifiable system of FIG. 12A allowing the compare if equal and invert, or the always invert system, set for the former.

FIG. 12B is an illustration 1200B of the user modifiable Census Transform system of FIG. 12A that includes the required comparators 1286, which accept the input 1288 image (not shown). In this illustration 1200B, a user (not shown) has set the logic control 1291 to zero causing the Census Transform to be performed utilizing the compare if equal and invert system 1294 generating an output 1296. As a result, the new Census Transform process as disclosed herein may be bypassed and therefore not employed.

Figure 12C:
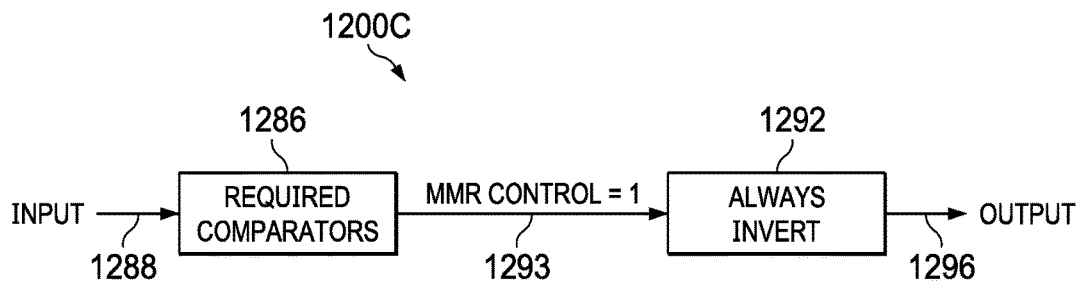
FIG. 12C is an illustration of the user modifiable system of FIG. 12A allowing the compare if equal and invert, or the always invert system, set for the latter.

FIG. 12C is an illustration 1200C of the user modifiable Census Transform system of FIG. 12A that includes the required comparators 1286, which accept the input 1288 image (not shown). In this illustration, a user (not shown) sets the logic control 1293 to one causing the Census Transform to be performed utilizing always invert system 1292 as disclosed herein to generate an output 1296. Thus, in this embodiment, the compare if equal and invert process is bypassed and not employed.

FIGS. 12A-12C provide an illustration of a modified Census Transform system in accordance with the disclosed principles that can provide the best of both a power reduction and decreased time in processing images from input to output. These figures further illustrate how a user can modify the disclosed system that performs the modified Census Transform. With one selected process, system power consumption is reduced, as well as the time required to process the entire image, while selecting the other reduces the time required to process the entire image and provides a small reduction in power consumption. Both modified Census Transform systems use the same calculation process as a traditional Census Transform, but in accordance with the disclosed principles they do not need the calculations to be performed on every pixel in a kernel unless it is the very first kernel calculated.

The "compare-if-equal-then-same, else-invert" system produces a Census signature that matches bit by bit the Census signature produced by the Original Census Transform algorithm. The new Census Transform produces a signature which does not match bit-by-bit with the original Census Transform but shall have the same properties such as it is a feature vector that describes the relative intensity changes around a pixel and shall be as useful as the original Census Transform in the many applications listed above. Thus, the principles of the Census Transform are used; however, every calculation need not be performed because many of the calculations are duplicative and redundant calculations that can be eliminated from the calculation process. The compare if equal and otherwise invert system disclosed herein reduces the calculations in favor of simpler logic blocks that can speed up the calculation time.

Alternatively, the disclosed Census Transform utilizing only performing the required comparisons and then inverting those calculations that would be redundant as they would always be invertible under traditional Census Transform conditions and Heaviside step function, reduces not only processing time but also allows for reduced power consumption and reduces the space or logic area required on the chip.

Figure 13:
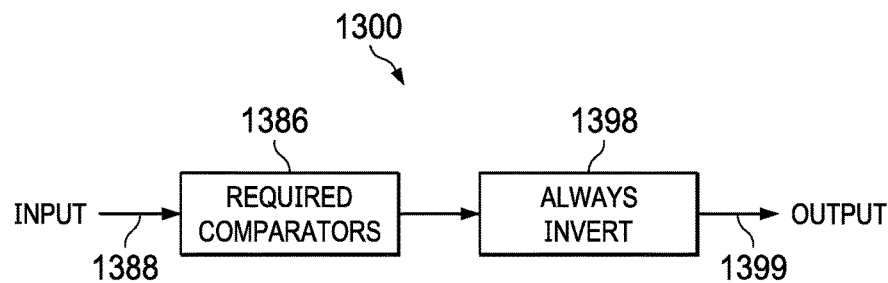
FIG. 13 is an illustration of an always invert system in accordance with the disclosed principles.

FIG. 13 is an illustration 1300 of a Census Transform system having only the always invert Census Transform system disclosed herein. An image creates an input 1388 that is then run through with the required comparators 1386. The Census Transform is performed using the always invert conjugate comparisons system 1398 resulting in an output 1399 that can be utilized by multiple image processing or image capture systems and tools. In such embodiments of the disclosed principles, only using the modified Census Transform utilizing a kernel that has been only performing the required comparisons and then inverting those calculations that would be redundant would be placed on the logic and/or circuit board, results in reduced chip area by reducing the number of comparators or other logic components, as well as an overall reduction in power consumption and calculation time.

While the disclosed principles have been particularly shown and described with reference to exemplary embodiments, it will be understood by those skilled in the art that various changes in form and detail may be made therein without departing from the spirit and scope of the disclosed principles. The inventors expect skilled artisans to employ such variations as appropriate, and the inventors intend the disclosed principles to be practiced otherwise than as specifically described herein. Accordingly, the disclosed principles include all modifications and equivalents of the subject matter recited in the claims appended hereto as permitted by applicable law. Moreover, any combination of the above-described elements in all possible variations thereof is encompassed by the disclosed principles unless otherwise indicated herein or otherwise clearly contradicted by context.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A system for performing Census Transforms, the system comprising:
   at least one input for receiving an image;
   a logic circuit comprising a set of comparators; and
   a processor coupled to the at least one input and to the logic circuit, wherein the processor is configured for:
      setting a support window of M×M pixels within the image;
      setting a first kernel window of N×N pixels within the support window;
      calculating a Census Transform signature for the first kernel window by comparing a grayscale intensity value of a reference pixel to that of each other pixel in the first kernel window using the set of comparators;
      setting a second kernel window of N×N pixels within the support window by shifting the first kernel window by at least one pixel; and
      calculating, using at least some of the set of comparators, a Census Transform signature for the second kernel window by:
         utilizing, for previously compared pixels in the second kernel window, previously calculated comparisons, in response to determining that the previously compared pixels have equal grayscale intensity values, and
         utilizing an inverse conjugate of the previously calculated comparisons, in response to determining that the previously compared pixels have differing grayscale intensity values.

2. The system of claim 1, wherein the logic circuit comprises a logic implementation block selected from the group consisting of a Field Programmable Gate Array (FPGA), an application-specific integrated circuit (ASIC), and a System-on-a-Chip (SoC).

3. The system of claim 2, wherein the processor configures the logic implementation block to provide the set of comparators.

4. The system of claim 3, wherein the configuring the logic implementation block is controlled by a user.

5. The system of claim 1, wherein the required set of comparators is configured for the first kernel window and the second kernel window.

6. The system of claim 1, wherein the logic circuit further comprises a set of inverters.

7. The system of claim 6, wherein the set of inverters is utilized to invert one or more outputs of individual comparators within the set of comparators for differing grayscale intensity values.

8. The system of claim 6, wherein the set of inverters is utilized to invert one or more outputs of individual comparators within the set of comparators for previously performed comparisons.

9. A method for performing Census Transform, the method comprising:
- receiving, by a device, an image;
- calculating, by a processor of the device, a grayscale intensity value for each of a plurality of pixels of the image;
- setting, by the processor, a support window of M×M pixels within the image;
- setting, by the processor, a first kernel window of N×N pixels within the support window;
- calculating, by the processor, a Census Transform signature for the first kernel window by comparing, by a set of comparators of a logic circuit the device, a grayscale intensity value of a reference pixel to that of each other pixel in the first kernel window;
- setting, by the processor, a second kernel window of N×N pixels within the support window by shifting the first kernel window by at least one pixel; and
- calculating, by the processor, a Census Transform signature for the second kernel window by:
  - for previously uncompared pixels in the second kernel window, comparing, by the set of comparators, a grayscale intensity value of a reference pixel of the second kernel window to other pixels in the second kernel window not previously compared to the reference pixel of the second kernel window, and
  - for previously compared pixels in the second kernel window, utilizing previously calculated comparisons, in response to determining that the previously compared pixels have equal grayscale intensity values, and utilizing an inverse conjugate of the previously calculated comparisons, in response to determining that the previously compared pixels have differing grayscale intensity values.

10. The method for performing Census Transform of claim 9, wherein calculating the Census Transform signature for the first kernel window comprises performing both a set of forward comparisons in relation to the reference pixel and a set of backward comparisons in relation to the reference pixel.

11. The method for performing Census Transform of claim 9, wherein comparing the previously uncompared pixels and comparing the previously compared pixels within the calculating a Census Transform signature for the second kernel window are performed simultaneously.

12. The method for performing Census Transform of claim 9, wherein calculating the Census Transform signature for the second kernel window for previously compared pixels further comprises:
- inverting an output of a previous comparison in response to determining that the grayscale intensity values of the reference pixel and the previously compared pixel are not equal; and
- associating the same output of the previous comparison in response to determining that the grayscale intensity values of the reference pixel and the previously compared pixel are equal.

13. The method for preforming Census Transform of claim 9, wherein the previous comparison is performed by a first group of comparators of the set of comparators, and the checking is performed by a second group of the set of comparators.

14. A method for performing a Census Transform, the method comprising:
- receiving by a device, an image;
- calculating, by a processor of the device, a grayscale intensity value for each of a plurality of pixels of the image;
- setting, by the processor, a support window of M×M pixels within the image;
- setting, by the processor, a first kernel window of N×N pixels within the support window;
- calculating, by the processor, a Census Transform signature for the first kernel window by comparing, by a set of comparators of a logic circuit of the device, a grayscale intensity value of a reference pixel to that of each other pixel in the first kernel window;
- setting, by the processor, a second kernel window of N×N pixels within the support window by shifting the first kernel window left-to-right by at least one pixel; and
- calculating, by the processor, a Census Transform signature for the second kernel window by:
  - for previously uncompared pixels in the second kernel window, comparing, by the set of comparators, a grayscale intensity value of a reference pixel of the second kernel window to other pixels in the second kernel window not previously compared to the reference pixel of the second kernel window, and
  - for previously compared pixels in the second kernel window, utilizing an inverse conjugate of previously calculated comparisons.

15. The method for performing Census Transform of claim 14, wherein calculating the Census Transform signature for the first kernel window comprises performing both a set of forward comparisons in relation to the reference pixel and performing a set of backward comparisons in relation to the reference pixel.

16. The method for performing Census Transform of claim 14, wherein the comparisons of previously uncompared pixels and utilizing previously compared pixels within the calculating a Census Transform signature for the second kernel window are performed simultaneously.

17. The method for performing Census Transform of claim 14, wherein calculating the Census Transform signature for the second kernel window for previously compared pixels further comprises:
- obtaining an output of the previous calculated comparison; and
- inverting the output of the previous calculated comparison.

* * * * *